(12) United States Patent
Cross et al.

(10) Patent No.: US 10,004,353 B2
(45) Date of Patent: Jun. 26, 2018

(54) METHOD, DEVICE AND CAPSULE FOR BREWING A BEVERAGE

(71) Applicant: Conopco, Inc., Englewood Cliffs, NJ (US)

(72) Inventors: David Murray Cross, Letchworth (GB); Michael Paton, Royston (GB); Cristian Simion Popa, Royston (GB); Alistair David Smith, Bangkok (TH); Terence John Wilby, Royston (GB)

(73) Assignee: CONOPCO, INC., Englewood Cliffs, NJ (US)

(*) Notice: Subject to any disclaimer, the term of this patent is extended or adjusted under 35 U.S.C. 154(b) by 234 days.

(21) Appl. No.: 14/776,935

(22) PCT Filed: Mar. 12, 2014

(86) PCT No.: PCT/EP2014/054859
§ 371 (c)(1),
(2) Date: Sep. 15, 2015

(87) PCT Pub. No.: WO2014/146952
PCT Pub. Date: Sep. 25, 2014

(65) Prior Publication Data
US 2016/0045059 A1    Feb. 18, 2016

(30) Foreign Application Priority Data

Mar. 21, 2013   (EP) ..................... 13160324
Mar. 21, 2013   (EP) ..................... 13160325
(Continued)

(51) Int. Cl.
*A47J 31/40*   (2006.01)
*A47J 31/46*   (2006.01)
(Continued)

(52) U.S. Cl.
CPC ......... *A47J 31/407* (2013.01); *A47J 31/0605* (2013.01); *A47J 31/0615* (2013.01);
(Continued)

(58) Field of Classification Search
CPC .. A47J 31/407; A47J 31/0605; A47J 31/0615; A47J 31/0642; A47J 31/46; B65D 85/8043
See application file for complete search history.

(56) References Cited

U.S. PATENT DOCUMENTS

| 3,975,996 A * | 8/1976 | Vitous .................. A47J 31/057 99/295 |
| 4,136,202 A | 1/1979 | Favre |

(Continued)

FOREIGN PATENT DOCUMENTS

| AT | 511357 | 11/2007 |
| AT | 511332 | 11/2012 |

(Continued)

OTHER PUBLICATIONS

Search Report & Written Opinion in EP15188381, dated Feb. 1, 2016.

(Continued)

*Primary Examiner* — Anthony Weier
(74) *Attorney, Agent, or Firm* — Foley & Lardner LLP

(57) ABSTRACT

A capsule for use in a brewing device is provided, the capsule having a body part, which defines a cavity, a lid which is attached to the body part and which closes the cavity, the lid having lines of weakness which define an opening region having an area of from 75 mm$^2$ to 300 mm$^2$; and tea material enclosed within the cavity, wherein at least 75% by weight of the tea material particles have a size of (Continued)

from 2 to 10 mm. A method of preparing a tea-based beverage in a brewing device using the capsule is also provided.

20 Claims, 10 Drawing Sheets

(30) Foreign Application Priority Data

| Mar. 21, 2013 | (EP) | 13160326 |
|---|---|---|
| Mar. 21, 2013 | (EP) | 13160328 |
| Mar. 21, 2013 | (EP) | 13160342 |
| Jul. 26, 2013 | (EP) | 13178265 |

(51) Int. Cl.
  *B65D 85/804* (2006.01)
  *A47J 31/06* (2006.01)

(52) U.S. Cl.
  CPC ........... *A47J 31/0642* (2013.01); *A47J 31/46* (2013.01); *B65D 85/8043* (2013.01)

(56) References Cited

U.S. PATENT DOCUMENTS

| 4,253,385 | A | 3/1981 | Illy |
|---|---|---|---|
| D311,138 | S | 10/1990 | Chanel |
| 4,983,410 | A | 1/1991 | Dinos |
| D322,539 | S | 12/1991 | Under |
| 5,325,765 | A | 7/1994 | Sylvan et al. |
| 5,425,480 | A | 6/1995 | Rabenau et al. |
| 5,619,904 | A | 4/1997 | Di Nunzio |
| 5,813,317 | A | 9/1998 | Ken-Hao-Chang |
| D407,640 | S | 4/1999 | Nelson et al. |
| 5,947,004 | A | 9/1999 | Huang |
| 6,009,792 | A | 1/2000 | Kraan |
| D420,856 | S | 2/2000 | Yeo et al. |
| D425,416 | S | 5/2000 | Denham et al. |
| 6,142,063 | A | 11/2000 | Beaulieu et al. |
| D436,532 | S | 1/2001 | Richardson |
| D438,103 | S | 2/2001 | Edwards et al. |
| D445,674 | S | 7/2001 | Pritchett |
| D445,675 | S | 7/2001 | Richardson |
| 6,316,753 | B2 | 11/2001 | Clothier et al. |
| 6,382,083 | B2 | 5/2002 | Schmed |
| D462,900 | S | 9/2002 | Yamada et al. |
| D477,186 | S | 7/2003 | de Groote et al. |
| D495,189 | S | 8/2004 | Cahen |
| 6,786,134 | B2 | 9/2004 | Green |
| D506,926 | S | 7/2005 | Halliday et al. |
| D520,185 | S | 5/2006 | Zeng et al. |
| D539,643 | S | 4/2007 | Abel |
| D540,608 | S | 4/2007 | Cahen |
| D549,361 | S | 8/2007 | To et al. |
| D571,656 | S | 6/2008 | Maslowski |
| 7,540,232 | B2 | 6/2009 | Bates et al. |
| D602,303 | S | 10/2009 | Cahen |
| D606,363 | S | 12/2009 | Aardenburg |
| 7,640,843 | B2 | 1/2010 | Halliday et al. |
| D616,251 | S | 5/2010 | Heiberg et al. |
| D624,785 | S | 10/2010 | Rousselin |
| 7,854,192 | B2 | 12/2010 | Denisart et al. |
| D630,880 | S | 1/2011 | Zimmermann |
| D632,568 | S | 2/2011 | Caldwell et al. |
| D643,682 | S | 8/2011 | Asthon |
| 8,010,050 | B2 | 8/2011 | Kennedy |
| D649,392 | S | 11/2011 | Cahen |
| D652,718 | S | 1/2012 | Caldwell et al. |
| D659,022 | S | 5/2012 | Kemner |
| D666,451 | S | 9/2012 | Cheng |
| D670,539 | S | 11/2012 | Starr et al. |
| D672,188 | S | 12/2012 | Luippold et al. |
| 8,333,144 | B2 | 12/2012 | Boussemart et al. |
| D681,386 | S | 5/2013 | Pininfarina |
| D684,043 | S | 6/2013 | Brown et al. |
| D688,392 | S | 8/2013 | Tsai |
| D689,768 | S | 9/2013 | Inderbitzin |
| D694,620 | S | 12/2013 | Hansen |
| D697,399 | S | 1/2014 | Parmar et al. |
| 8,690,013 | B2 | 4/2014 | Kneer |
| D704,494 | S | 5/2014 | Blanc |
| 8,770,095 | B2 | 7/2014 | Pecci et al. |
| 8,820,974 | B2 | 9/2014 | Chang et al. |
| D715,465 | S | 10/2014 | Hasuo et al. |
| 8,871,285 | B2 | 10/2014 | Markoulis et al. |
| 8,993,018 | B2 | 3/2015 | Bucher et al. |
| D732,386 | S | 6/2015 | Paton et al. |
| 9,603,201 | B2 | 3/2017 | Bogel et al. |
| 9,625,280 | B2 | 4/2017 | Frese |
| 2002/0048621 | A1 | 4/2002 | Boyd et al. |
| 2002/0078831 | A1 | 6/2002 | Cai |
| 2002/0148357 | A1* | 10/2002 | Lazaris ............... A47J 31/3628 99/295 |
| 2003/0033938 | A1 | 2/2003 | Halliday et al. |
| 2005/0015348 | A1 | 1/2005 | Knepler |
| 2005/0172822 | A1 | 8/2005 | Macchi et al. |
| 2005/0236323 | A1 | 10/2005 | Oliver et al. |
| 2006/0065127 | A1 | 3/2006 | Dalton et al. |
| 2006/0174770 | A1 | 8/2006 | Jordana |
| 2008/0072766 | A1 | 3/2008 | Kobylarz |
| 2008/0105130 | A1 | 5/2008 | Koeling et al. |
| 2008/0148948 | A1 | 6/2008 | Evers et al. |
| 2009/0155422 | A1 | 6/2009 | Ozanne |
| 2009/0220650 | A1 | 9/2009 | Ozanne |
| 2010/0055252 | A1 | 3/2010 | Marina et al. |
| 2010/0132564 | A1 | 6/2010 | Ozanne et al. |
| 2010/0154644 | A1 | 6/2010 | Skalski et al. |
| 2010/0173056 | A1 | 7/2010 | Yoakim et al. |
| 2010/0180775 | A1 | 7/2010 | Kollep et al. |
| 2010/0239734 | A1 | 9/2010 | Yoakim et al. |
| 2010/0263546 | A1 | 10/2010 | Leuzinger et al. |
| 2010/0288131 | A1 | 11/2010 | Kilber et al. |
| 2011/0052761 | A1 | 3/2011 | Yoakim et al. |
| 2011/0303095 | A1 | 12/2011 | Fu et al. |
| 2011/0308399 | A1 | 12/2011 | Jung |
| 2012/0070543 | A1* | 3/2012 | Mahlich ............. B65D 85/8043 426/77 |
| 2012/0098526 | A1 | 4/2012 | Bucher et al. |
| 2013/0095212 | A1* | 4/2013 | Beer .................. B65D 85/8043 426/80 |
| 2013/0119930 | A1 | 5/2013 | Sakoda et al. |
| 2013/0129872 | A1 | 5/2013 | Kruger |
| 2013/0302476 | A1* | 11/2013 | Abegglen ............... A47J 31/22 426/112 |
| 2014/0196608 | A1 | 7/2014 | Amrein et al. |
| 2014/0272016 | A1* | 9/2014 | Nowak .............. B65D 85/8043 426/112 |
| 2014/0356484 | A1 | 12/2014 | Capitani |
| 2015/0143999 | A1 | 5/2015 | Cross et al. |
| 2015/0173558 | A1 | 6/2015 | Cross et al. |
| 2015/0190010 | A1 | 7/2015 | Cross et al. |
| 2015/0203285 | A1* | 7/2015 | Baldo .................. A47J 31/407 426/112 |
| 2015/0239655 | A1* | 8/2015 | Schroeder .......... B65D 85/8043 426/115 |
| 2016/0045059 | A1 | 2/2016 | Cross et al. |
| 2016/0114967 | A1 | 4/2016 | Van Belleghem et al. |
| 2016/0270580 | A1 | 9/2016 | Smith |

FOREIGN PATENT DOCUMENTS

| CA | 289071 | 10/2012 |
|---|---|---|
| CN | 2636781 | 9/2004 |
| CN | 101056561 | 10/2007 |
| DE | 202012104474 | 1/2013 |
| EP | 0334573 | 9/1989 |
| EP | 0451980 | 3/1991 |
| EP | 0455337 | 3/1991 |
| EP | 0554469 | 8/1993 |
| EP | 1772081 | 10/2005 |
| EP | 1654966 | 5/2006 |

(56) References Cited

FOREIGN PATENT DOCUMENTS

| | | |
|---|---|---|
| EP | 1658796 | 5/2006 |
| EP | 1772398 | 10/2006 |
| EP | 1922962 | 11/2006 |
| EP | 1774878 | 4/2007 |
| EP | 1849718 | 10/2007 |
| EP | 1937115 | 7/2008 |
| EP | 2263501 | 12/2010 |
| EP | 2243378 | 6/2011 |
| EP | 2476633 | 7/2012 |
| GB | 1561188 | 2/1980 |
| GB | 2437483 | 4/2006 |
| GB | 2485575 | 5/2013 |
| JP | 5376171 | 7/1978 |
| JP | 54161781 | 11/1979 |
| JP | 57140239 | 9/1982 |
| JP | 10275275 | 10/1998 |
| RU | 2192140 | 11/2002 |
| WO | WO2006038227 | 4/2006 |
| WO | WO2007019993 | 2/2007 |
| WO | WO07042486 | 4/2007 |
| WO | WO2007042415 | 4/2007 |
| WO | WO2007042485 | 4/2007 |
| WO | WO2008025730 | 3/2008 |
| WO | WO2008058576 | 5/2008 |
| WO | WO2008156283 | 12/2008 |
| WO | WO2009130311 | 10/2009 |
| WO | WO2010076263 | 7/2010 |
| WO | WO2011000723 | 1/2011 |
| WO | WO2011000724 | 1/2011 |
| WO | WO2011000725 | 1/2011 |
| WO | WO2011141532 | 11/2011 |
| WO | WO2012010317 | 1/2012 |
| WO | WO2012072508 | 6/2012 |
| WO | WO2013008012 | 1/2013 |
| WO | WO2012144885 | 10/2013 |

OTHER PUBLICATIONS

Search Report in EP15180266, dated Dec. 9, 2015 (NPL 1).
Written Opinion in EP15180266, dated Dec. 9, 2015 (NPL 2).
Miahcel Harney, Brewing Temperature, The Harney & Sons Guide to Tea, 2008, p. 12, ., The Penguin Press, .
Jan. 1, 2013, Espresso Coffee Club Nespresso Swiss Capsules 2013 p. 1, p. 1 (NPL 1, p. 1).
Oct. 7, 2014, IPRP2 in PCTEP2013063942 (NPL 1, pp. 2-14).
CBTL Caffitaly E Caffe Capsules 2013 p. 1, Jan. 1, 2013, p. 1 (NPL 1, p. 15).
IPRP in PCTEP2014054859, dated Mar. 9, 2015 (NPL 1, pp. 16-22).
IPRP2 in PCTEP2013063947, dated Nov. 21, 2014 (NPL 1, pp. 23-40).
IPRP2 in PCTEP2013063950, dated Jul. 6, 2014 (NPL 1, pp. 41-54).
Nespresso Single Serve Capsules 2013 p. 1, Jan. 1, 2013, p. 1 (NPL 1, p. 55).
Search Report in EP12175405, dated Jan. 24, 2013 (NPL 1, pp. 56-57).
Search Report in EP12175406, dated Dec. 21, 2012 (NPL 1, pp. 58-59).
Search Report in EP14159168, dated Jun. 24, 2014 (NPL 1, pp. 60-62).
Search Report in PCTEP2013063942, dated Feb. 11, 2014 (NPL 1, pp. 63-66).
Search Report in PCTEP2013063943, dated Feb. 7, 2014 (NPL 1, pp. 67-69).
Search Report in PCTEP2013063946, dated Feb. 6, 2014 (NPL 1, pp. 70-72).
Search Report in PCTEP2013063947, dated Mar. 24, 2014 (NPL 1, pp. 73-81).
Search Report in PCTEP2013063948, dated Mar. 24, 2014 (NPL 2, pp. 1-6).
Search Report in PCTEP2013063949, dated Feb. 6, 2014 (NPL 2, pp. 7-10).
Search Report in PCTEP2013063950, dated Feb. 7, 2014 (NPL 2, pp. 11-15).
Search Report in PCTEP2014054859, dated Jul. 2, 2014 (NPL 2, pp. 16-19).
Written Opinion in EP12175405, dated Jan. 24, 2013 (NPL 2, p. 20).
Written Opinion in EP12175406, dated Dec. 21, 2012 (NPL 2, pp. 21-23).
Written Opinion in PCTEP2013063942, dated Feb. 11, 2014 (NPL 2, pp. 24-29).
Written Opinion in PCTEP2013063943, dated Feb. 11, 2014 (NPL 2, pp. 30-34).
Written Opinion in PCTEP2013063946, dated Feb. 6, 2014 (NPL 2, pp. 35-39).
Written Opinion in PCTEP2013063947, dated Mar. 24, 2014 (NPL 2, pp. 40-48).
Written Opinion in PCTEP2013063948, dated Mar. 24, 2014 (NPL 2, pp. 49-55).
Written Opinion in PCTEP2013063949, dated Feb. 6, 2014 (NPL 2, pp. 56-60).
Written Opinion in PCTEP2013063950, dated Feb. 7, 2014 (NPL 2, pp. 61-65).
Written Opinion in PCTEP2014054859, dated Jul. 2, 2014 (NPL 2, pp. 66-70).
Co-pending application, Cross et al., U.S. Appl. No. 14/408,617, filed Dec. 17, 2014.
Co-pending application, Cross et al., U.S. Appl. No. 14/408,624, filed Dec. 17, 2014.
Co-pending application, Cross et al., U.S. Appl. No. 14/408,635, filed Dec. 17, 2014.
Co-pending application, Cross et al., U.S. Appl. No. 14/408,639, filed Dec. 17, 2014.
Co-pending application, Cross et al., U.S. Appl. No. 14/408,638, filed Dec. 17, 2014.
Definition of Intersect, Merriam-Webster Dictionary, 2017, 1 Page.
Search Report & Written Opinion in EP17155955, dated May 22, 2017.
Definition for Contain, Dictionary.com, Jun. 27, 2017, pp. 1-4.
Measuring and Memory Systems, Kaman Inductive Technology Handbook, 2012, pp. 1-39.
Stephen A. Dyer, In-depth coverage of instrumentation and measurement from the Wiley Encyclopedia of Electrical, Wiley Survey of Instrumentation and Measurement, 2017, pp. 1-5.

\* cited by examiner

METHOD, DEVICE AND CAPSULE FOR BREWING A BEVERAGE

TECHNICAL FIELD OF THE INVENTION

The present invention relates to a method, a device and a capsule for brewing a beverage. In particular, the invention relates to infused tea-based beverages that are brewed in a device having an infusion chamber.

BACKGROUND TO THE INVENTION

Beverages such as tea and coffee are usually prepared in the home using ground coffee, tea bags or loose-leaf tea. However, the long brewing time required and the mess that is produced are inconvenient. Therefore brewing devices have been devised which provide a convenient, rapid and consumer-friendly way of brewing such beverages. The beverage material is typically provided in a single use capsule or other container which is disposed of after brewing the beverage. For coffee beverages the capsule itself typically functions as the brewing chamber. The volume of the capsule is normally less than that of the final beverage, so it is necessary for the brewing water to flow through the capsule. This is achieved by having a filter in the capsule so that the brewed beverage can be dispensed whilst the beverage material is retained, and is disposed of together with the capsule.

This method, however, is not well-suited for brewing tea, as tea leaves require a larger volume in which to infuse. Therefore devices for brewing tea have been designed which have a separate, larger infusion chamber. For example, WO 2007/042485 discloses a device for preparing an infused beverage, having an infusion container for containing liquid. A cartridge containing tea leaves is introduced into a cavity in the device. The bottom part of the cartridge comprises a liquid-permeable filter. The infusion container and the cavity communicate with each other, so that when liquid is poured into the infusion container it flows to the cartridge. The tea leaves are thus immersed in the liquid and infusion takes place. After infusion has taken place, a passage communicating with the cavity is opened to let the infused liquid flow from the infusion container through the cavity and through the filter of the cartridge to the passage. The spent tea leaves are collected in the cartridge and are removed from the cavity together with the cartridge. Whilst the infusion chamber allows space for tea leaves to infuse, this method has a number of disadvantages. In particular the cartridge must provide sufficient area for the filter to allow the beverage to be dispensed in a short time once brewing has taken place. Moreover, the cartridge has a lid or seal so that the tea leaves are enclosed. This lid must be removed, or at least substantially opened in order to allow the spent tea leaves to be collected after brewing. It may be opened automatically by the device, which requires extra complexity. Alternatively, it may be manually opened before brewing, which is inconvenient for the user. Secondly the cartridge must have sufficient volume to contain the spent tea leaves which swell during infusion, typically to around four times their dry volume. Thus the cartridge has to be relatively large. It also has to be sufficiently strong to support the weight of the spent tea leaves when it is removed from the device. Thus a substantial amount of material (e.g. plastic) is required to make the capsule. Furthermore, the capsule body and filter are typically made from different materials, so the capsule cannot be easily recycled. These are both undesirable from the point of view of cost and also environmental impact.

Hence it is an object of the present invention to overcome some or all of these disadvantages.

BRIEF DESCRIPTION OF THE INVENTION

The present invention solves these problems by locating the filter in the capsule holder so that the spent tea leaves no longer need to be collected in the capsule. This removes the need to completely open the lid of the capsule; the lid only needs to be partially opened to release the tea leaves from the capsule into the brewing chamber. Accordingly, in a first aspect, the present invention provides a capsule for use in a brewing device, the capsule comprising:
  a body part, which defines a cavity;
  a lid which is attached to the body part and which closes the cavity,
  the lid having lines of weakness which define an opening region having an area of from 75 mm$^2$ to 300 mm$^2$; and
  tea material enclosed within the cavity, wherein the tea material particles have a size of from 2 to 10 mm.

Preferably the body part of the capsule has a flange, and the lid is attached to the flange.

In a second aspect the invention provides a method of preparing a tea-based beverage in a brewing device using a capsule according to the first aspect of the invention, the device comprising:
  an infusion chamber with a bottom rim which defines an opening;
  a capsule holder for receiving the capsule, the capsule holder comprising a sidewall having an upper rim, a filter and an openable and closable passage on the opposite side of the filter from the upper rim;
  means for opening the opening region of the capsule lid;
  the method comprising the steps of:
  a) inserting the capsule into the capsule holder;
  b) connecting the upper rim of the capsule holder to the bottom rim of the infusion chamber;
  c) introducing liquid into the capsule and releasing the tea material from the capsule so that the liquid and tea material mix and flow into the infusion chamber so as to brew the beverage;
  d) after brewing has taken place, opening the passage in the capsule holder to allow the beverage to flow from the infusion chamber through the filter and out through the passage;
wherein the opening region of the capsule lid is opened by the opening means during step b).

In a third aspect, the invention provides a brewing device containing a capsule according to the first aspect of the invention, the device comprising
  an infusion chamber with a bottom rim which defines an opening;
  a capsule holder for receiving a capsule, the capsule holder comprising a sidewall having an upper rim, a filter and an openable and closable passage on the opposite side of the filter from the upper rim;
  means for moving the capsule holder and/or the infusion chamber so that the upper rim of the capsule holder is connected to the bottom rim of the infusion chamber;
  means for opening the opening region of the capsule lid;
  means for introducing liquid into the capsule so that the liquid and tea material can mix and flow into the infusion chamber so as to brew a beverage; and
  a valve for opening the passage in the capsule holder to allow the beverage to flow from the infusion chamber through the filter and out through the passage.

In a fourth aspect, the invention provides the use of capsule of the first aspect of the invention for preparing a beverage.

By having the filter in the capsule holder rather than in the capsule, the capsule holder can perform the many of the functions performed in the prior art by the capsule, and thus the functionality required of the capsule is significantly reduced.

Firstly, since the beverage is filtered through the capsule holder, there is no need for the capsule to contain a filter or provide sufficient area for the filter; there is also no need to puncture or otherwise open the capsule on two opposite sides.

Secondly, there is no need for the capsule to hold the spent tea leaves, and consequently there is no need to fully open the lid; it is sufficient to create a smaller opening in the lid which allows the tea leaves to be released into the infusion chamber. The tea particles should be large enough that they are visible to the user as they move around in the infusion chamber, since the motion of the tea leaves creates an attractive visual experience for the user. Thus the opening must be large enough so that the largest tea leaves are able to pass through it. However opening all of the lid, or indeed a large part of it, requires a complex opening system. Thus the tea leaves should not be so large that the opening required in order to release them is very big. The size of the opening is defined by the location of the lines of weakness in the lid.

Thirdly, the capsule does not need to form a water-tight connection with the infusion chamber. In fact, the capsule is immersed in the brewing liquid. Thus the capsule can be much simpler, smaller and can have thinner walls since it only needs to be large enough and strong enough to contain the dry tea leaves.

DETAILED DESCRIPTION OF THE INVENTION

As used herein the term "tea material" refers to tea plant material, herb plant material or a mixture thereof. For the avoidance of doubt, the term "tea material" does not include coffee material. The term "tea plant material" refers to leaf, bud and/or stem material from *Camellia sinensis* var. *sinensis* and/or *Camellia sinensis* var. *assamica*. The tea plant material may be substantially fermented (i.e. black tea), partially fermented (i.e. oolong tea) or substantially unfermented (i.e. green tea or white tea). It may also be a blend of one or more of the aforementioned tea plant materials. Other ingredients which are commonly used to flavour leaf tea products may also be combined with the tea plant material (e.g. bergamot, citrus peel and the like). The term "herb plant material" refers to material which is commonly used as a precursor for herbal infusions. Preferably the herb plant material is selected from chamomile, cinnamon, elderflower, ginger, hibiscus, jasmine, lavender, lemongrass, mint, rooibos (obtained from *Aspalathus linearis*), rosehip, vanilla and verbena. The tea material may additionally comprise fruit pieces (e.g. apple, blackcurrant, mango, peach, pineapple, raspberry, strawberry etc).

Preferably the tea material is dried and has a moisture content of less than 30 wt %, more preferably less than 20 wt % and most preferably from 0.1 to 10 wt %.

Most of the tea material particles have a size (i.e. longest diameter) of from about 2 to about 10 mm, preferably 3 to 7 mm. In particular, at least 75%, preferably at least 90% by weight of the tea particles have a size of from 2 to about 10 mm, preferably 3 to 7 mm.

The term "beverage" refers to a substantially aqueous drinkable composition which is suitable for human consumption. Preferably the beverage comprises at least 85% water by weight of the beverage, more preferably at least 90% and most preferably from 95 to 99.9%. Preferably the beverage comprises from 0.04 to 3%, more preferably from 0.06 to 2%, most preferably from 0.1 to 1% by weight tea solids.

The term "brewing" refers to the addition of a liquid, particularly hot water, to tea material, so that steeping or soaking the tea material in the liquid releases soluble substances into the liquid (e.g. flavour and/or aroma molecules) thereby to form a beverage. Brewing may be carried out at any temperature, but preferably in the range of 80 to 95° C.

The term "infusion chamber" means a vessel in which infusion of tea material takes place, and which is large enough both to allow the tea material to move around in the liquid during infusion, and also to contain a substantial part (i.e. at least 50%) of the volume of the final beverage. The term "infusion chamber" therefore does not refer to capsules inside which brewing takes place, as is typically the case in coffee machines.

The term "capsule" refers to a rigid or semi-rigid container in which tea material is or may be packaged, for example a capsule, cartridge, pod, or the like.

The present invention will now be described with reference to the figures, wherein.

Figure 7A:
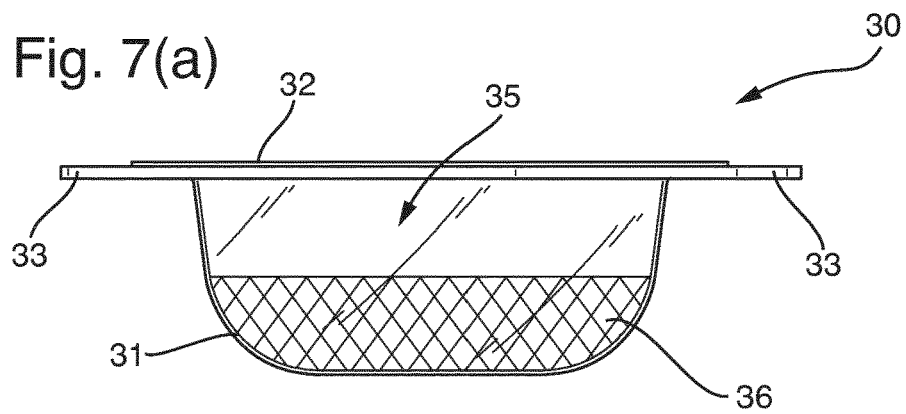
Figure 7B:
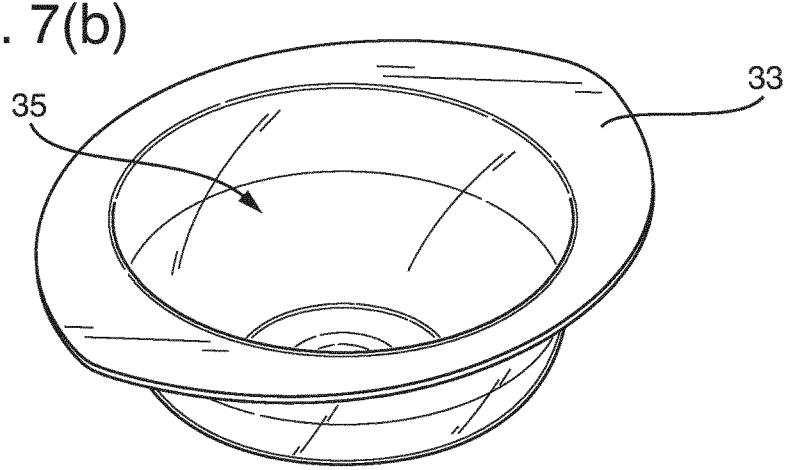
Figure 7C:
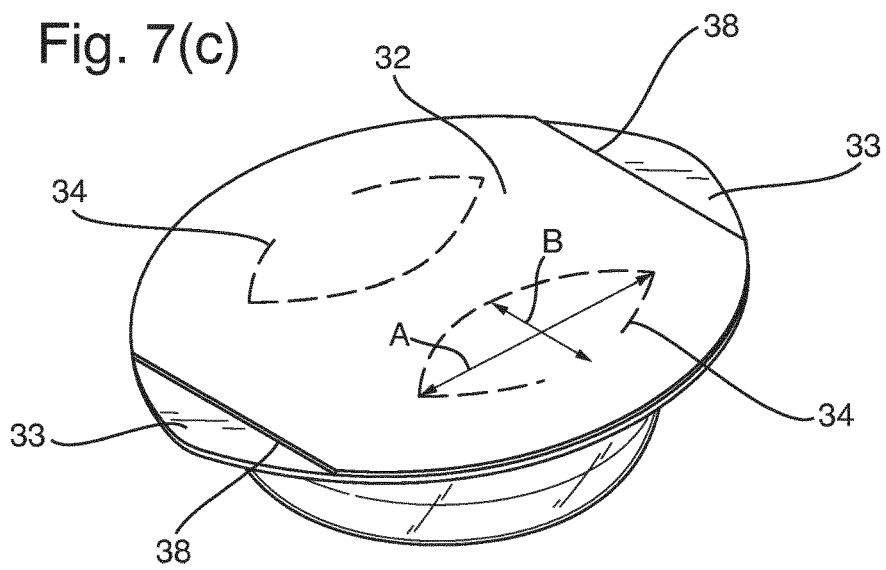

FIGS. 7a, 7b, and 7c, respectively, show a side view of a capsule, a perspective view of a capsule without a lid and with a lid.

Figure 8A:
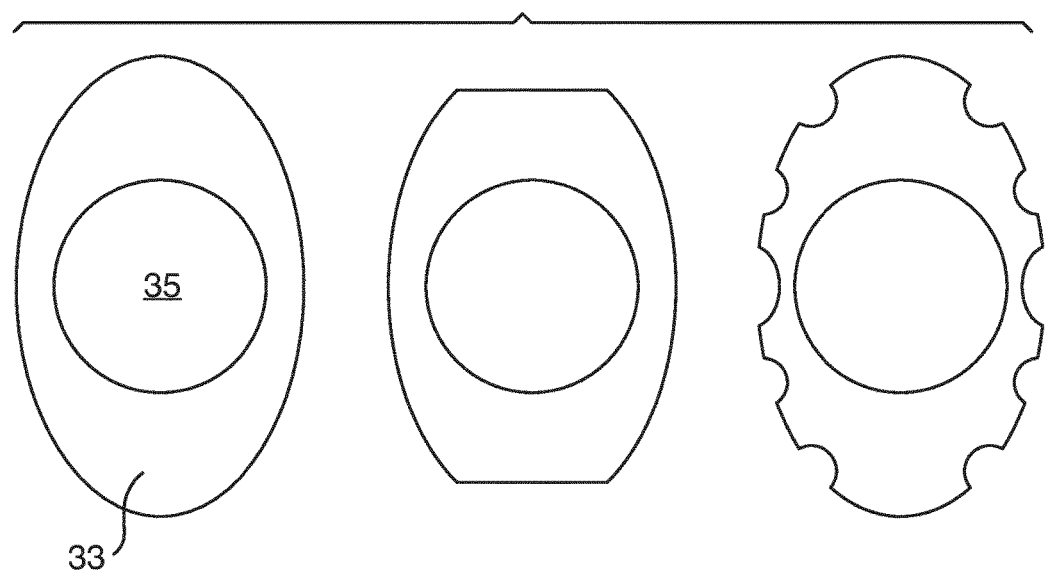
Figure 8B:
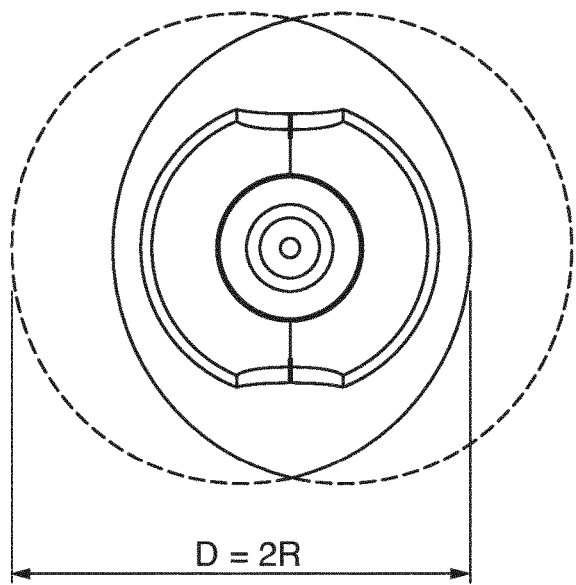

FIGS. 8a and 8b show views from above of capsules having various generally elliptical shaped flanges.

Figure 9:
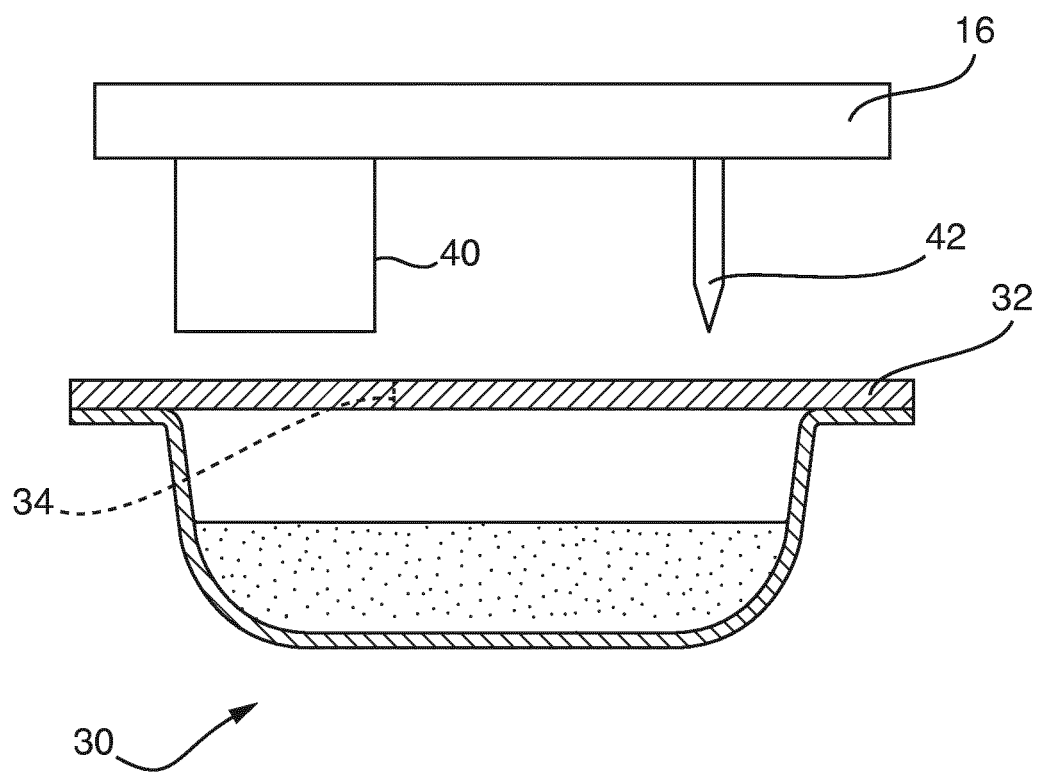

FIG. 9 shows the manifold of the infusion chamber with an opening member for opening the lid of the capsule.

Figure 1:
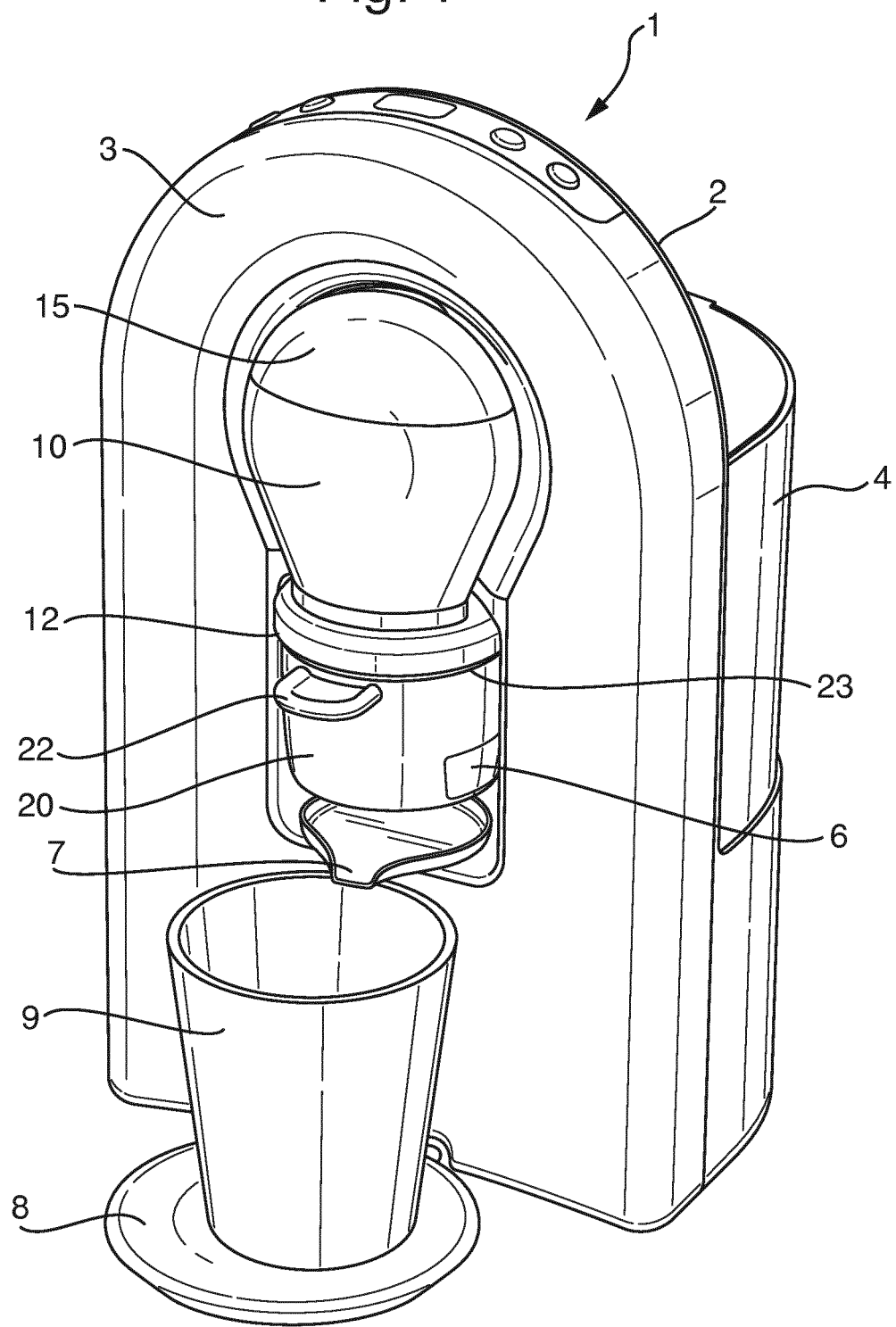
FIG. 1 shows a brewing device according to the invention.

FIG. 1 shows one non-limiting embodiment of a brewing device according to the invention. The device 1 has a casing 2 with a front side 3 and a rear side 4. An infusion chamber 10 and a capsule holder 20 are located at the front side of the device. The infusion chamber 10 has a bottom rim 12 which defines an opening in its lower side. The infusion chamber may have an opening in its top side which is covered with a removable lid 15, or it may be constructed as a vessel without an opening in its top side. The capsule holder 20 is designed to receive a capsule. It is located in a support 6 and preferably has a handle 22. The capsule holder is preferably substantially circular when viewed from above, which provides for easy cleaning since there are no corners in which tea leaves could become trapped.

In FIG. 1, the capsule holder 20 is shown in position for brewing, i.e. so that the upper rim 23 of the capsule holder is in water-tight contact with the bottom rim 12 of the infusion chamber 10. The infusion chamber 10 is supported and held in place by a manifold (not shown). A water reservoir, heater, and pump (not shown) are located inside the rear 4 of the casing. At the bottom of the front side 3 of the casing there is a tray 8 on which a cup 9 is placed when the beverage is dispensed. A dispensing spout 7 is positioned beneath the capsule holder.

Figure 2:
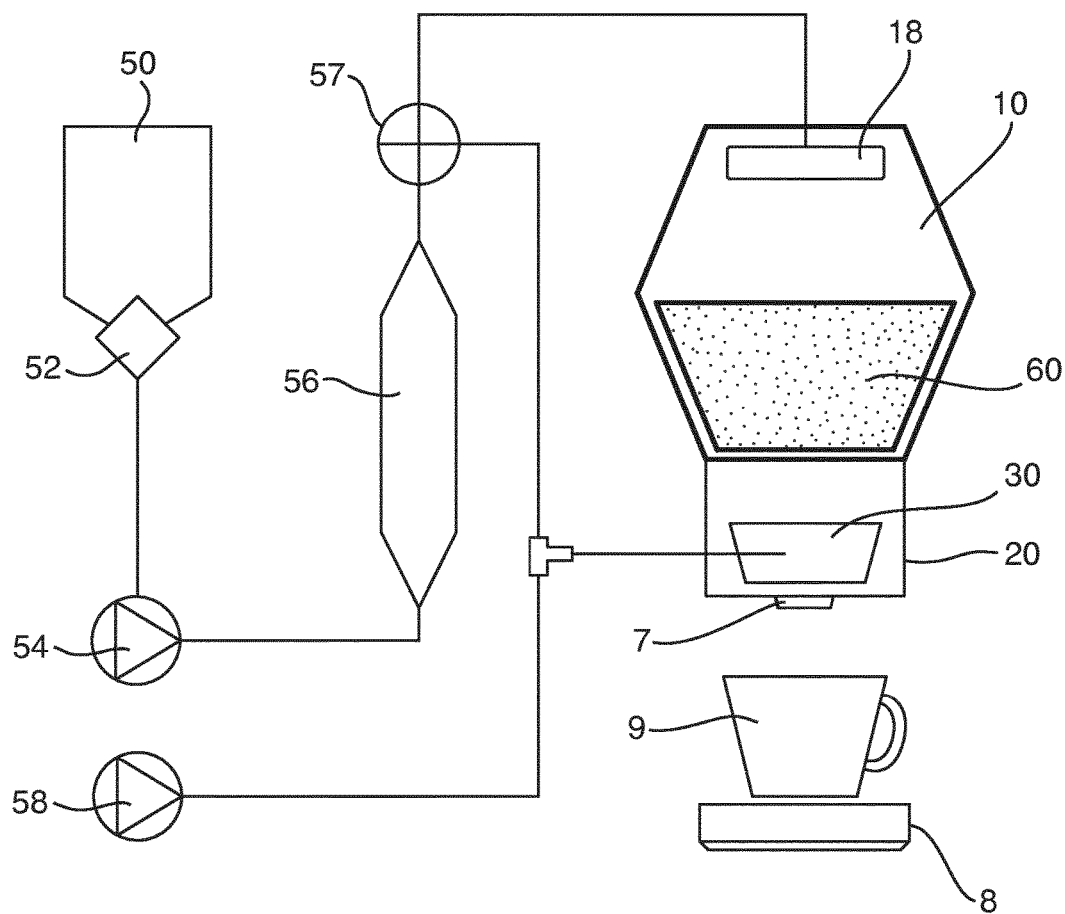
FIG. 2 is a schematic diagram showing the main functional components of the device.

FIG. 2 is a schematic diagram showing the main functional components of the device. Water from the reservoir 50 is fed to the infusion chamber 10 via a water filter 52, a water pump 54, a heater 56 and a valve 57. The heater is preferably a flow-though heater. The valve 57 controls the route the water takes between the heater 56 and the infusion chamber 10. For example, the water may firstly be pumped to the infusion chamber 10 via the capsule 30 in order to brew a beverage 60. Subsequently, the valve 57 can re-direct the water such that it enters the infusion chamber 10 via a rinse head 18 in order to rinse and/or clean the infusion chamber 10. There may also be an air pump 58 which can pump air to the infusion chamber, for example via the capsule 30 which is located in the capsule holder 20, or via the capsule holder itself. The spout 7, cup 9 and tray 8 are located beneath the capsule holder 20.

Figure 3:
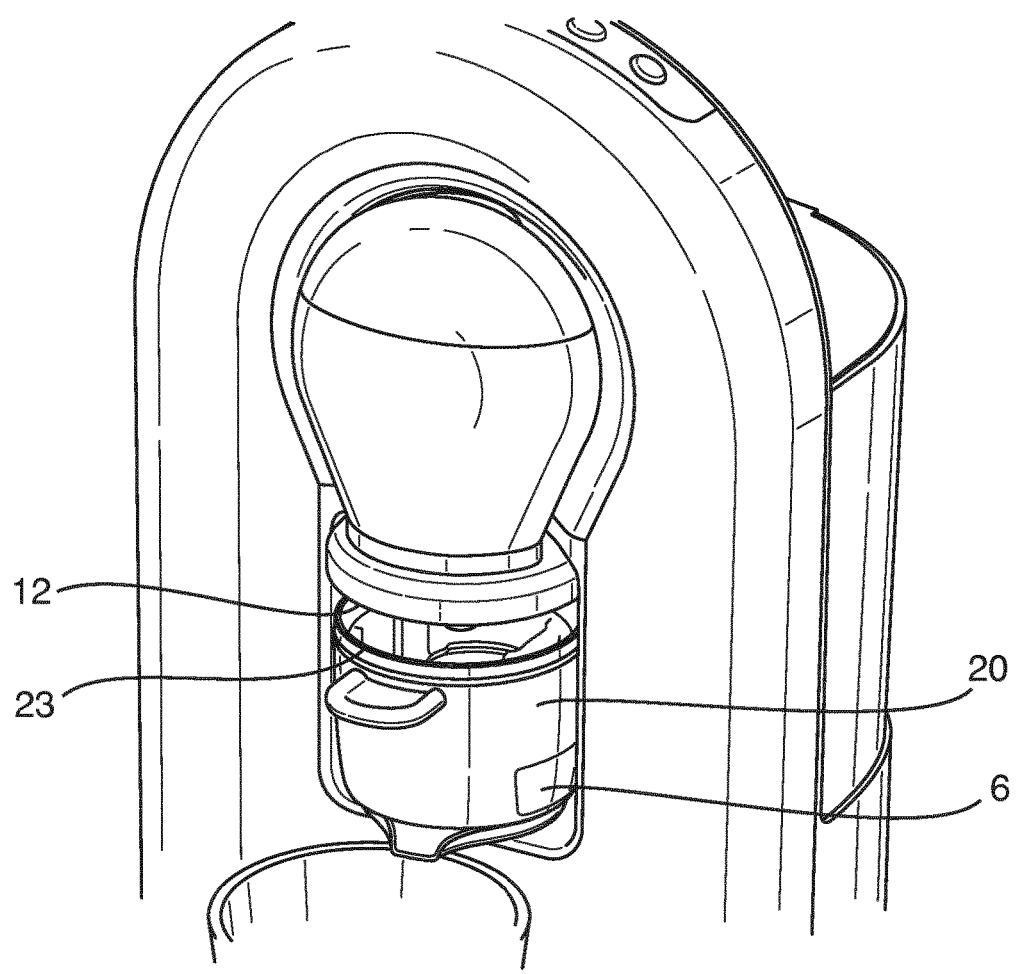
FIG. 3 shows the device of FIG. 1 with the capsule holder in its lowered position.
Figure 4:
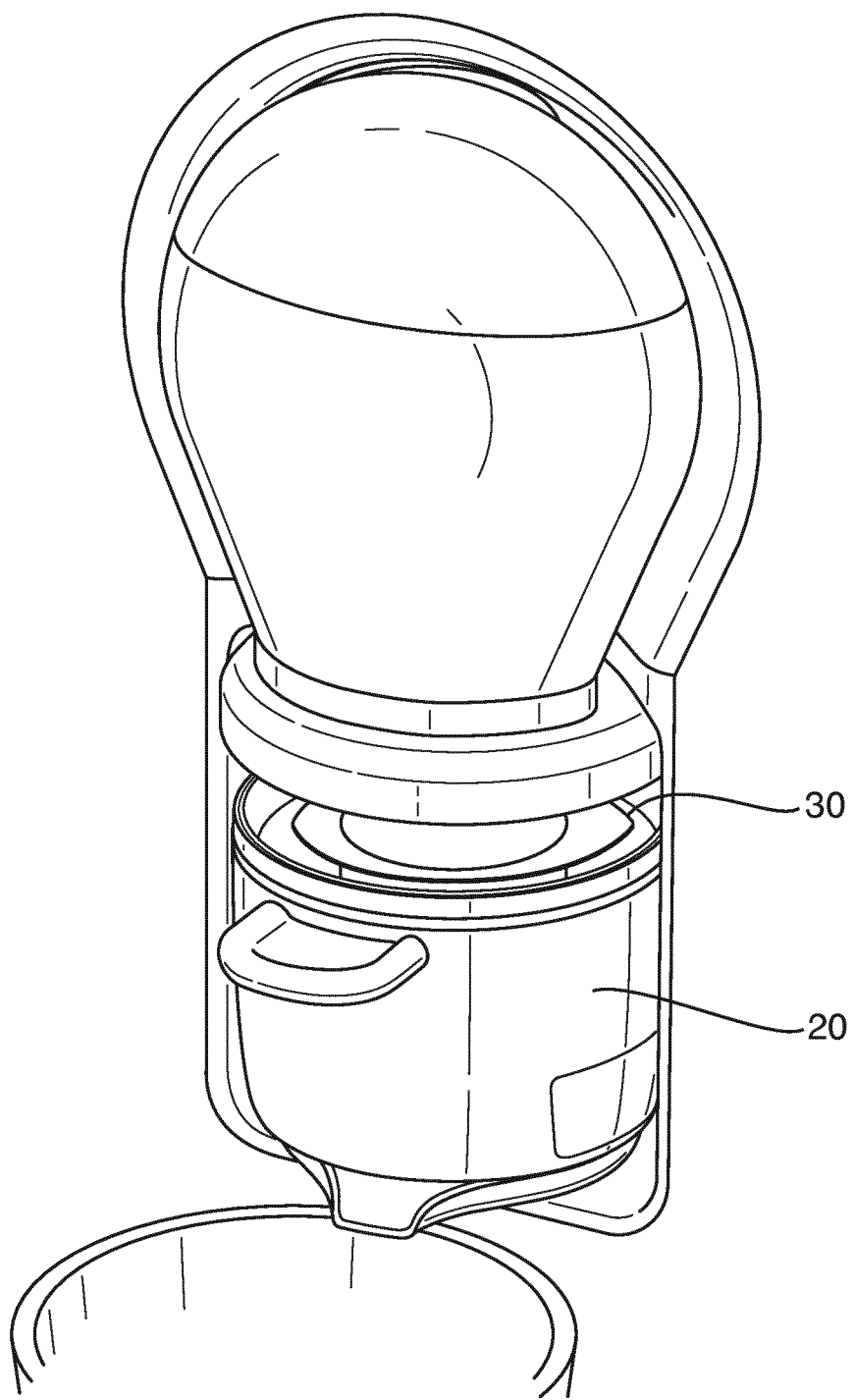
FIG. 4 shows the device as in FIG. 3, now with a capsule inserted into the capsule holder.

FIG. 3 shows the device of FIG. 1 with the capsule holder 20 lowered so that its upper rim 23 is separated from the bottom rim 12 of the infusion chamber. The capsule holder 20 is preferably removable from the support 6 so that a capsule can be easily inserted, and also for ease of cleaning. FIG. 4 shows the device with a capsule 30 inserted into the capsule holder 20, which is in the lowered position.

Figure 5A:
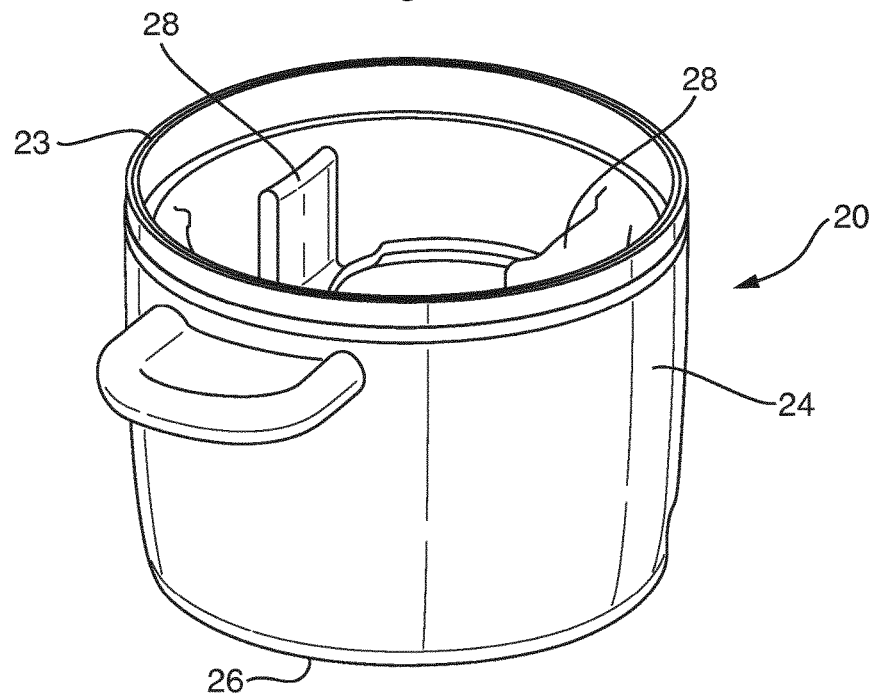
FIGS. 5a and 5b show a first embodiment of the capsule holder removed from the device.
Figure 5B:
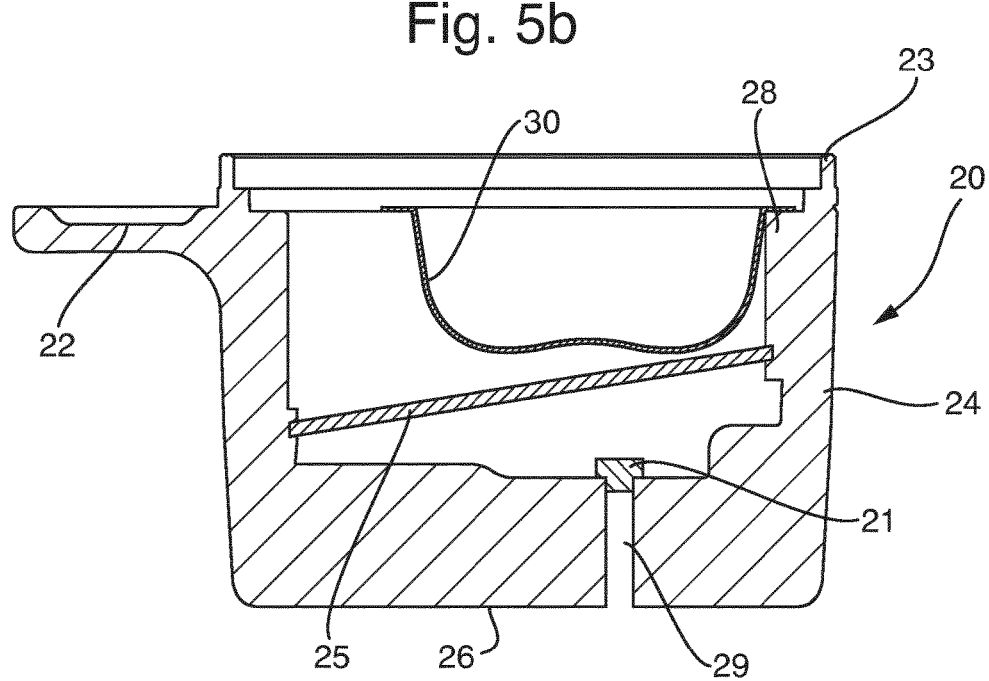

FIG. 5 shows one embodiment of a capsule holder removed from the device: (a) in a perspective view and (b) in cross-section. The capsule holder 20 has a sidewall 24 with an upper rim 23 and a base 26. For ease of cleaning, it is important that the capsule holder does not have corners or gaps in which tea leaves can become trapped. Therefore the sidewall 24 is preferably circular when viewed from above. A filter 25 is located inside the capsule holder. One or more protrusions 28 on the inside of the sidewall 24 and/or the base 26 support the capsule 30 above the filter 25. The capsule does not cover the whole of the area inside the upper rim of the capsule holder, so that there is a route for the brewed beverage to pass from the infusion chamber to the filter. Beneath the filter 25 is a passage 29 through which the beverage flows during dispensing and which is closed by a drain valve 21 during brewing. The filter preferably consists of a fine mesh made, for example, of stainless steel, nylon, polyester or PTFE. The mesh size must be sufficiently small to catch small pieces of tea material but large enough to ensure that draining is not too slow. Preferably, the mesh size is from 100 to 500 microns, more preferably 150 to 300 microns. Preferably the filter (when in its normal position in the device) is inclined to the horizontal at an angle of from 5 to 45°, preferably from 10 to 30°, such as about 20°. Having the filter at an angle to the horizontal has two advantages: firstly it presents a larger surface area, and hence increases the speed of draining. Secondly tea material collects at the bottom of the sloped filter while leaving the upper part clear of tea material so that the beverage drains freely through it.

Figure 6A:
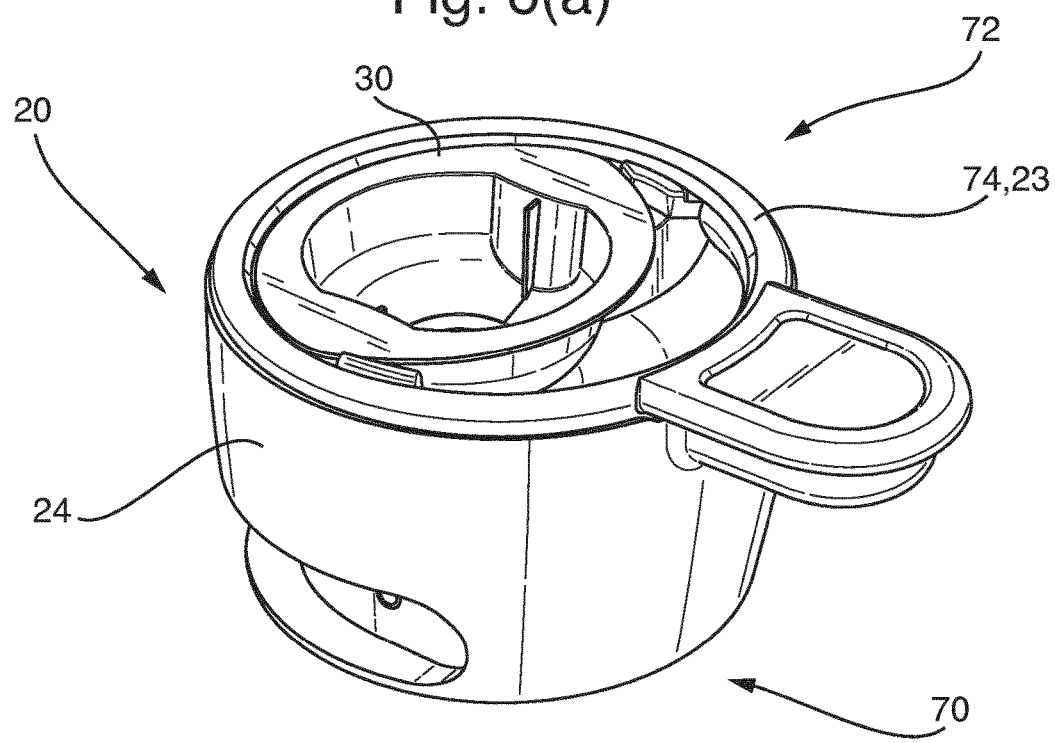
FIGS. 6a and 6b show a second embodiment of the capsule holder removed from the device, and containing a capsule.
Figure 6B:
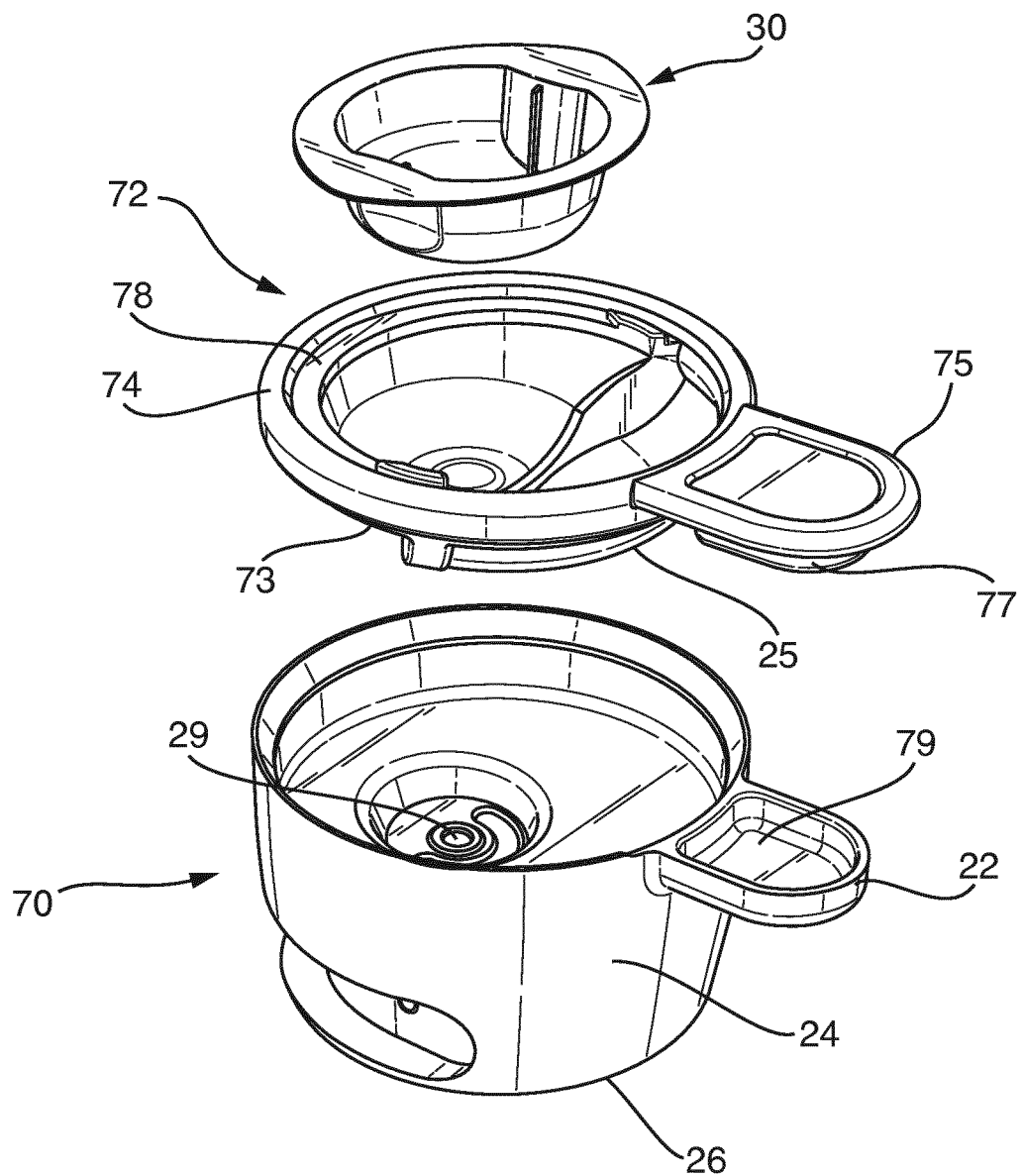

FIG. 6 shows perspective views of a second embodiment of the capsule holder 20 which consists of two separable parts, a receptacle 70 and a strainer 72. FIG. 6(*a*) shows the capsule holder when assembled with a capsule 30 in place, and FIG. 6(*b*) shows the capsule, strainer and receptacle separated.

The receptacle 70 has a sidewall 24 and a base 26. Again, the sidewall is preferably circular when viewed from above. Located in the base 26 is a passage 29 through which the beverage flows during dispensing and which is closed by a drain valve (not shown) during brewing. The receptacle 70 has a handle 22.

The strainer 72 has a base 73, a rim 74 and a handle 75. One or more protrusions 78, such as a shelf on the inside of the rim 74, support the capsule 30 and hold it in place above the base. At least part of the base 73 is made up of a filter 25. In the preferred embodiment shown, the part of the base 73 which is located underneath the capsule is solid whilst the rest of the base consists of the filter. The solid part may also serve to support the capsule. The filter preferably consists of a fine mesh made, for example, of stainless steel, nylon, polyester or PTFE. The mesh size must be sufficiently small to catch small pieces of tea material but large enough to ensure that draining is not too slow. Preferably, the mesh size is from 100 to 500 microns, more preferably 150 to 300 microns.

As shown in FIG. 6(*a*), in use the strainer 72 rests on the receptacle and is supported by the sidewall 24. The rim 74 of the strainer forms the upper rim 23 of the capsule holder 20. The strainer covers the whole of the top of the receptacle 70, so that liquid cannot pass between the rim 74 of the strainer and the sidewall 24 of the receptacle, and hence can only enter the receptacle 70 by passing through the filter. The filter prevents spent tea leaves from entering the receptacle 70. Preferably the rim 74 is made from an elastomeric material. Thereby it is in effect a gasket which forms seals both between the receptacle and the strainer, and also between the capsule holder and the infusion chamber.

This embodiment has the advantage that the strainer and receptacle can be easily separated for cleaning. Moreover, in order to empty out spent tea leaves from the capsule holder, it is only necessary to remove the strainer and tip the spent leaves out from it.

Preferably the handle 75 of the strainer is larger than and overlaps the handle 22 of the receptacle. When the strainer is located in the receptacle, the handle 75 of the strainer sits on top of handle 22 of the receptacle, as shown in FIG. 6(*a*). This allows the receptacle and strainer to be picked up together, by gripping them from above and below. Nonetheless, the strainer can be easily removed from the receptacle by gripping the edges of its handle 75 where it extends beyond the handle 22 of the receptacle.

The handle 75 of the strainer may optionally have a projection 77 on its lower side, which rests in a corresponding hollow 79 in the top side of the handle 22 of the receptacle. This helps to locate the strainer correctly with respect to the receptacle. The strainer may optionally have a lip (not shown) on its rim, for example located opposite the handle, which rests in a corresponding notch in the top of the sidewall of the receptacle. This helps to locate the strainer correctly with respect to the receptacle, and also to support it.

FIG. 7(*a*) shows a side view of a capsule 30. The capsule comprises a body part 31 and a lid 32. The body part 31 defines a cavity 35 in which the tea material 36 is placed. The lid is attached to the body part so as to enclose the tea material 36 within the capsule. The functionality required of the capsule is significantly reduced compared to known capsules, because the capsule does not contain a filter. The brewing liquid does not need to enter through one side and exit through the other, so there is no need to puncture or otherwise make an opening in the body part of the capsule. Thus the construction of the capsule is greatly simplified. Thus the body part is a single, impermeable piece and does not contain any means (for example a filter, or an openable or weakened area) for allowing liquid to enter or exit the capsule through the body part. The body part is preferably made from plastic or aluminium. It may be formed for example by injection moulding or by thermoforming.

The cavity 35 is preferably generally circular in cross-section, when viewed from above, as shown in FIG. 7(b). This shape is convenient from the point of view of manufacture and also for filling tea material into the capsule. It also facilitates release of the tea material from the capsule during brewing, since there are no corners or other areas where the tea material could become trapped. "Generally circular" does not require that the cavity has an exactly circular cross-section; thus for example it could have small indents, provided that there are no narrow recesses in which tea material could become trapped.

The body part preferably comprises a flange 33, and the lid is preferably attached to the flange, e.g. by heat-sealing, thereby enclosing the tea material. In order to provide sufficient area to attach the lid securely, the flange is preferably at least 3 mm wide. The flange 33 preferably also serves to support the capsule in the capsule holder by resting on the protrusions on the inside the capsule holder, described above. Thus the flange is preferably shaped and sized to match its intended location in the capsule holder.

Since the capsule only needs to be large enough to contain a single serving of the dry tea material it can be much smaller than known capsules. Thus the internal volume of the capsule (i.e. the volume of the cavity) is from 10 to 24 $cm^3$, preferably 12 to 19 $cm^3$, most preferably from 14 to 18 $cm^3$. Moreover, the capsule only needs to be strong enough to support dry tea material, and not wet spent tea material. Thus the body part of the capsule can also have relatively thin walls.

In another preferred embodiment, the capsule is only partially filled with dry tea material. If the capsule contained a high proportion of dry tea material then the tea would swell during wetting and would become jammed in the capsule and not be able to flow out of the capsule. Additionally some headspace within the capsule helps when forming a flap, as discussed below. Thus, preferably the capsule is filled with from 25 to 60 vol % of dry tea material. This relates to the natural settled volume of the capsule that is filled with dry tea material before any water is added and is uncompressed. For example the fill level obtained after shaking the capsule so the tea material moves around freely within the capsule and then settles under its own weight. For example, a cylindrical capsule with the lower half filled with dry tea and the upper half vacant would comprise 50 vol % of dry tea material.

The reduced capsule size means that the amount of material (e.g. plastic) needed to make the capsule is significantly reduced. This has environmental and cost advantages. Furthermore, the capsule body part can be more easily recycled because it is made of a single material, unlike typical capsules having a filter. A small capsule also has the advantage of taking up less space during transport and during storage, for example in a consumer's cupboard.

The cavity must not be so shallow that tea material bounces out of it during filling. Thus the depth of the cavity is preferably at least 10 mm, more preferably at least 13 mm. On the other hand, the cavity must not be so deep that it is difficult to remove the tea material from the capsule at the start of brewing. Thus the depth of the cavity is preferably at most 20 mm, more preferably at most 18 mm. It is easier to remove the tea material from a cavity with a depth in the upper part of this range when the volume of the cavity is also towards the upper end of its range (i.e. when the cavity is not both deep and narrow).

The cross-sectional area and diameter of the cavity are related to the required volume and depth. Consequently, the diameter of the cavity is preferably from 30 to 45 mm. The lid, which overlaps with or covers the flange as well as covering the cavity, is therefore preferably from about 45 to 60 mm in diameter, more preferably 47 to 58 mm. The lid is preferably shaped to generally match the shape of the flange.

The lid, typically on the uppermost face of the capsule, is preferably made of a thin film, more preferably metallic foil or a laminated foil, most preferably a laminate of aluminium foil and polyethylene.

The lid has lines of weakness, such as perforations or scores in order to facilitate opening the capsule to release the tea material, as will be described below. The lines of weakness define an opening region on the capsule lid which has an area of from 75 $mm^2$ to 300 $mm^2$, preferably from 100 $mm^2$ to 250 $mm^2$. The area of the opening region refers to the area of the opening which is created when the capsule is opened in the brewing device.

In one embodiment, the lines of weakness surround the opening region, so that the whole part of the lid inside the lines of weakness can be removed to form the opening. However, in a preferred embodiment the lines of weakness only partially surround the opening region: for example, the lines of weakness may constitute three sides of a square, In this way the during opening, the lid is torn or cut along the lines of weakness, leaving a section of the opening region which remains attached to the rest of the lid (i.e. the fourth side of the square) to form a flap, which opens inwardly into the capsule.

In a particularly preferred embodiment, the lid 32 has a line of weakness 34 in the form of a curve, with sections which extend backwards from the ends of the curve, as shown in FIG. 7(c). This configuration produces a well-defined opening when the lid is pushed against an opening member (described below), which allows the tea leaves to be released from the capsule. The part of the lid between the ends of the sections which extend backwards is not perforated or scored, and forms a hinge on opening. The opening region forms a flap which opens inwardly into the capsule. The resulting opening is approximately elliptical in shape, with a short axis (marked B in FIG. 7(c)) aligned along the radial direction of the capsule and a long axis (marked A in FIG. 7(c)) perpendicular to it. The length of the long axis is defined by the distance between the end points of the curved line of weakness, and the short axis is defined by the distance between the point of the curve closest to the centre of the lid and the line of the hinge. Preferably the short axis has length of from 8 to 18 mm, more preferably from 10 to 15 mm. Preferably the long axis has a length of from 25 to 35 mm, more preferably from 28 to 32 mm. The flap should be large enough to allow the large tea particles to be released, but should not be too big, because that would increase the chance of tea particles becoming trapped behind it.

Preferably the lines of weakness are perforations. The cut:tie ratio of the perforations should be such that they do not burst too easily, for example during transport, but nonetheless open without requiring too great a force. For example, for an aluminium foil/polyethylene laminate lid, a cut:tie ratio of from 1:1 to 1:3, preferably around around 1:2 is suitable.

Preferably the capsule lid has two identical sets of lines of weakness (as shown in FIG. 7(c)) so that the capsule can be placed in the capsule holder in either of the two possible orientations.

Typically the capsules are provided to the consumer in air-tight secondary packaging, for example as multipacks containing a plurality of capsules (e.g. ten). The multipacks may contain packages of a single type, or a mixture of packages containing different types of tea (e.g. green tea, black tea, herbal tea). Having a perforated lid has a further advantage in that some of the tea aroma is released from the tea material inside the capsule into the space inside the secondary packaging. Thus the consumer obtains the aroma of tea on opening the secondary pack.

In a preferred embodiment, the cavity has a generally circular cross-section, but the flange is elongated, for example it is generally elliptical in shape, or is defined by two intersecting circular arcs. "Generally elliptical" does not require that the flange is exactly elliptical. The flange has a radius of curvature that is similar to the radius of the inside of the sidewall 24 of the capsule holder, so that the shape of the flange generally corresponds to the shelf. Nonetheless, small variations from an elliptical shape can be accommodated whilst there is still sufficient overlap between the flange and the shelf to support the capsule. Some examples of generally elliptical shapes are shown in FIG. 8. This shape of flange allows the capsule to be supported by the shelf 78 on the inside of the sidewall of the capsule holder. This avoids the need for supporting ribs or protrusions inside the capsule holder, which could trap tea leaves, and hinder cleaning. The ratio of the longest diameter of the flange to the shortest diameter of the flange is preferably from 1.2:1 to 1.5:1. A minimum ratio of 1.2:1 gives plenty of space for the brewed beverage to pass by the capsule, and a maximum ratio of 1.5:1 means that the capsule can be large enough to contain sufficient tea material, without requiring an excessively large capsule holder. Most preferably the flange of the capsule is defined by two intersecting circular arcs each having a radius of curvature (R) which is substantially half of the internal diameter (D) of the capsule holder, as shown in FIG. 8(*b*). This shape of flange corresponds to the shelf 78 on the inside of the sidewall of the capsule holder. In this embodiment, the shape of the lid is preferably also defined by two intersecting circular arcs, but with truncated ends 38, as shown in FIG. 7(*c*). The length of the lid between the two truncated ends is from 47 to 58 mm, and the maximum width of the lid is from 45 to 50 mm. The capsule is symmetrical (in particular it has 180° rotational symmetry about a vertical axis). There are preferably two sets of perforations in the lid, arranged symmetrically, as shown in FIG. 7(*c*), so that the capsule can be placed in the capsule holder in either of two orientations.

In a preferred embodiment, the body part of the capsule is transparent, so that the tea material inside the capsule is visible. This is attractive to the consumer, and also has the advantage that the contents can be inspected for quality control purposes after filling using optical means, rather than, for example, by weight.

In use, the device functions as follows. With the capsule holder in its lowered position, the user removes the capsule holder from the support, or in the second embodiment of the capsule holder shown in FIG. 6, the user may just remove the strainer from the receptacle. A capsule containing tea material is placed into the capsule holder so that it rests on the protrusions on the inside of the sidewall and/or the base of the capsule holder. The protrusions support the capsule and preferably also locate it in the correct position.

The capsule holder is then replaced on the support. Next the user raises the support, for example by pressing a button on the device which activates an actuator. The capsule holder travels vertically upwards until it connects with the infusion chamber, and forms a water-tight seal. In an alternative embodiment, the infusion chamber could move down towards the capsule holder.

In the context of the present invention, 'connecting the upper rim of the capsule holder to the bottom rim of the infusion chamber' and 'the upper rim is connected to the bottom rim of the infusion chamber' should be understood to mean that upper rim of the capsule holder and the bottom rim of the infusion chamber form a water-tight contact, so that the capsule holder and infusion chamber form a vessel in which the brewing liquid can be held while brewing takes place. The capsule holder and infusion chamber may be connected by means of an intermediate member such as a gasket (for example a ring made of rubber or other compliant material located on the upper rim of the capsule holder and/or the bottom rim of the infusion chamber) in order to provide a good seal. The infusion chamber and the capsule holder form a space for brewing when connected. Preferably the volume of the space for brewing is at least 75%, more preferably at least 90% of the volume of the final beverage.

The device may have means for recognizing a capsule and/or reading information from a code associated with the capsule or the capsule holder. Different codes may be associated with different types of tea (e.g. green tea, black tea, herbal tea etc.). This allows the capsule to be recognized by the device, so that the device can automatically set the parameters for the brewing operation, such as the brewing time, water temperature etc. It also allows the device to be programmed so that it only operates if the correct type of capsule is present. Thus a valid code signifies that an expected type of capsule is present, and an invalid code signifies an unexpected type of capsule, a capsule that has already been used or that no capsule is present. The recognition system can be of any suitable type, such as mechanical interlocking between the capsule and the capsule holder; optical recognition (e.g. by means of colour, fluorescence or bar code), electrical, magnetic, radio-frequency identification (RFID) chip etc.

Optionally, the device may also have means for allowing the user to adjust the parameters of the brewing operation, such as the brewing time, the receptacle size etc. The means may suitably consist of buttons or other inputs on the device, together with a control system.

The lid of the capsule is opened automatically by the device after the capsule has been inserted into the capsule holder in order to release the tea material. Preferably the lid is opened as the upper rim of the capsule holder is connected to the bottom rim of the infusion chamber. Preferably, two openings are made in the lid, one to introduce liquid into the capsule and the other to release liquid and tea material into the infusion chamber. However, because the capsule does not have a filter, there is no need to puncture or otherwise make an opening in the base of the capsule.

In a preferred embodiment, shown in FIG. 9, the lid is opened by pushing it against opening means comprising one or more static opening members when the capsule holder travels upwards to connect with the bottom rim of the infusion chamber. The lid 32 is pushed against a static opening member 40 located on the infusion chamber manifold 16. The function of the member is to create an opening in the lid which is defined by the pre-formed lines of weakness in order to release liquid and tea material. This creates a flap which opens inwardly of the cavity of the capsule. Preferably the lines of weakness are perforations so that the member 40 can be blunt, for example a wire. It can be seen that the capsule comprises approximately 50 vol % of dry tea material.

In a preferred embodiment the member 40 is aligned in the radial direction of the capsule and is sized so as to correspond to the width of the opening region in the radial direction. This shaped member together with the preferred embodiment of the perforations shown in FIG. 7(*c*) and described above results in an approximately elliptical opening in which the flap formed by the area of the lid which is opened is pushed back against the wall of the body part of the capsule, and is therefore held out of the way whilst the tea material is released. Preferably the hinge part of the lid is situated just inside the capsule wall, so that the rim of the capsule acts as a pivot for the flap. Moreover, because the member is aligned with the short axis of the opening, it does not reduce the width of the opening, so does not restrict release of the larger tea particles. Thus the member can remain in place during release of the tea leaves, which simplifies its construction. In contrast, if the blade were aligned along the long axis of the opening, it would effectively halve the width of the opening, which could necessitate retracting it in order to allow the large tea particles to be released.

In the preferred embodiment shown in FIG. 9, a second opening for introducing liquid into the capsule is made by pushing the lid against a static needle 42 consisting of a tube with a pointed end. The needle 42 pierces the lid. Water is then pumped from the reservoir to the heater, which is preferably a flow-though heater. The resulting hot water (and optionally steam) is then pumped to the capsule and enters it through the needle. The influx of hot water pushes the tea material out from the capsule through the opening made by the opening member 40 and into the infusion chamber 10.

The heater and pump are controlled so that the target brew temperature (which is typically in the range 80° C. to 95° C.) is achieved in the infusion chamber. Typically the water flow rate is in the range of 200 to 400 ml/min, and the volume of water is 150 to 300 ml, depending on the desired size of the beverage.

Preferably the infusion chamber 10 is made of transparent material such as glass, or transparent plastic, so that the user can see the motion of the tea material (such as tea leaves) whilst the beverage is brewing. Most preferably, the infusion chamber is made of Tritan™ copolyester because this material is transparent and has been found to have good resistance to staining. Air may be pumped into the capsule holder 20 (e.g. via the static needle) or directly into the infusion chamber 10 to create bubbles in the water and thereby agitate the tea material. This not only enhances the visual appearance, but also aids infusion and helps to prevent the tea material from sticking to the sides of the infusion chamber. Moreover, the introduction of air releases aroma which can optionally be vented via a tube, which for example, has an outlet near to the dispensing spout or near the top of the infusion chamber, thereby providing the user with the aroma of tea during brewing. The brewing time, which typically ranges from 10 to 120 seconds, is preferably set by user input and/or information read from the capsule.

Once brewing has taken place for the required time, the drain valve 21 located in the base of the capsule holder 20 is opened, allowing the beverage to drain from the infusion chamber. Preferably the opening of the drain valve is controlled automatically by the machine. The beverage flows from the infusion chamber through the filter 25 located in the capsule holder below the capsule, through the passage 29, and finally into a cup 9 which the user has already placed onto the tray 8. Tea material is prevented from entering the cup 9 by the filter 25.

Optionally, there may be a dispensing spout 7 positioned beneath the capsule holder as shown in FIG. 1, so that the beverage is dispensed through the drain valve and out through the spout. Thus, instead of being dispensed vertically downwards into the receptacle, the beverage follows an arc, similar to that of tea poured from the spout of a tea pot. This enhances the "theatre" provided by the machine for the user, and also emphasizes the "tea-ness" of the beverage, as distinct from coffee making machines.

After the beverage has been dispensed, the spent tea material may be rinsed from the wall of the brew chamber with further hot water. Preferably the rinsing water is introduced through rotating rinse jets 18 located near the top of the infusion chamber. Better rinsing is achieved by rotating rinse jets than static ones. In a preferred embodiment, rinsing takes place immediately after the beverage has been dispensed, and the rinse water is also dispensed into the receptacle and becomes part of the beverage. This removes the need for separate disposal of the rinse water. In this case, the rinse water provides around 15-30% of the total volume of the beverage, e.g. the volume of rinse water used is around 50 ml.

Finally, after the beverage has been dispensed, the capsule holder is lowered, preferably automatically, or alternatively by the user, for example by activating a button. The user then removes the capsule holder from the support, using the handle 22, or in the second embodiment of the capsule holder shown in FIG. 6 the user may just remove the strainer from the receptacle. The used capsule and spent tea leaves are then disposed of, and the capsule holder can be rinsed. Since the capsule holder is removable from the brewing device, it is easy to clean. The capsule holder is then returned to the support, ready for the next use.

The device can be cleaned, for example by running a rinse cycle with no tea material or by running a cycle with a cleaning material, for example sodium percarbonate. The cleaning material can be provided in a capsule, or alternatively as a tablet which is simply placed in the capsule holder.

The various features of the embodiments of the present invention referred to in individual sections above apply, as appropriate, to other sections mutatis mutandis. Consequently features specified in one section may be combined with features specified in other sections as appropriate. Various modifications of the described modes for carrying out the invention which are apparent to those skilled in the relevant fields are intended to be within the scope of the following claims.

The invention claimed is:

1. A capsule for use in a brewing device, the capsule comprising:
   a body part, which defines a cavity;
   a lid which is attached to the body part and which closes the cavity, the lid having lines of weakness which define an opening region having an area of from 75 mm$^2$ to 300 mm$^2$; and
   tea material enclosed within the cavity, wherein at least 75% by weight of the tea material particles have a size of from 2 to 10 mm;
   wherein the opening region is biased into the cavity by the brewing device in use; and
   wherein the capsule does not comprise a filter.

2. The capsule of claim 1, wherein the body part of the capsule has a flange, and the lid is attached to the flange.

3. The capsule of claim 1, wherein at least 75% by weight of the tea material particles have a size of from 3 to 7 mm.

4. The capsule of claim 1, wherein the area of the opening region is from 100 mm² to 250 mm².

5. The capsule of claim 1, wherein the lines of weakness partially surround the opening region so that the opening region of the lid forms a flap once the lid is opened.

6. The capsule of claim 1, wherein some of the lines of weakness are arranged along a first curve and others of the lines of weakness are arranged to extend from ends of the first curve along a second curve, so that the resulting opening is approximately elliptical in shape with a short axis aligned along the radial direction of the capsule and a perpendicular long axis.

7. The capsule of claim 6, wherein the short axis has a length of from about 8 mm to about 18 mm, and the long axis has a length of from about 25 mm to about 35 mm.

8. The capsule of claim 1, wherein the lines of weakness are perforations.

9. The capsule of claim 1, wherein the lid is an aluminium foil/polyethylene laminate lid and the cut:tie ratio of the perforations is from about 1:1 to about 1:3.

10. The capsule of claim 1, wherein the lines of weakness are equally divided into a first group defining the opening region and a second group defining a second opening region; and
wherein the opening region and the second opening region are on opposite sides of the capsule.

11. The capsule of claim 1, wherein the cavity is filled with from 25 to 60% by volume of tea material.

12. A method of preparing a tea-based beverage in a brewing device using a capsule according to claim 1, the device comprising:
an infusion chamber with a bottom rim which defines an opening;
a capsule holder for receiving a capsule, the capsule holder comprising a sidewall defining an internal volume and having an upper rim, a filter coupled to the sidewall below the upper rim, the filter spanning across the internal volume, and an openable and closable passage extending through the sidewall at a location below the filter; and
means for opening the opening region of the capsule lid;
the method comprising steps of:
a) inserting the capsule into the capsule holder;
b) connecting the upper rim of the capsule holder to the bottom rim of the infusion chamber;
c) introducing liquid into the capsule and releasing the tea material from the capsule so that the liquid and tea material mix and flow into the infusion chamber so as to brew the beverage; and
d) after brewing has taken place, opening the passage in the capsule holder to allow the beverage to flow from the infusion chamber through the filter and out through the passage;
wherein the opening region of the capsule lid is opened by the opening means during step b).

13. A brewing device containing a capsule according to claim 1, the device comprising:
an infusion chamber with a bottom rim which defines an opening;
a capsule holder for receiving a capsule, the capsule holder comprising a sidewall defining an internal volume and having an upper rim, a filter coupled to the sidewall below the upper rim, the filter spanning across the internal volume, and an openable and closable passage extending through the sidewall at a location below the filter;

means for moving the capsule holder and/or the infusion chamber so that the upper rim of the capsule holder is connected to the bottom rim of the infusion chamber;
means for opening the opening region of the capsule lid;
means for introducing liquid into the capsule so that the liquid and tea material can mix and flow into the infusion chamber so as to brew a beverage; and
a valve for opening the passage in the capsule holder to allow the beverage to flow from the infusion chamber through the filter and out through the passage.

14. A multipack containing a plurality of capsules according to claim 1.

15. A method of preparing a tea-based beverage in a brewing device using a capsule, the capsule being for use in the brewing device, the capsule comprising:
a body part, which defines a cavity;
a lid which is attached to the body part and which closes the cavity, the lid having lines of weakness which define an opening region having an area of from 75 mm2 to 300 mm2, the lines of weakness interspaced by a plurality of distances; and
tea material enclosed within the cavity, wherein at least 75% by weight of the tea material particles have a size of from 2 to 10 mm;
the brewing device comprising:
an infusion chamber with a bottom rim which defines an opening;
a capsule holder for receiving a capsule, the capsule holder comprising a sidewall defining an internal volume and having an upper rim, a filter coupled to the sidewall below the upper rim, the filter spanning across the internal volume, and an openable and closable passage extending through the sidewall at a location below the filter; and
means for opening the opening region of the lid;
the method comprising steps of:
e) inserting the capsule into the capsule holder;
f) connecting the upper rim of the capsule holder to the bottom rim of the infusion chamber;
g) introducing liquid into the capsule and releasing the tea material from the capsule so that the liquid and tea material mix and flow into the infusion chamber so as to brew the beverage; and
h) after brewing has taken place, opening the passage in the capsule holder to allow the beverage to flow from the infusion chamber through the filter and out through the passage;
wherein the opening region of the lid is opened by the opening means during step b).

16. The method of claim 15, wherein the flap thus formed opens inwardly into the cavity of the capsule.

17. The method of claim 15, wherein the capsule has a top face positioned proximate to the upper rim and a bottom face opposite the top face; and
wherein the top faces comprises the lid having lines of weakness.

18. A brewing device containing a capsule for use in the brewing device, the capsule comprising:
a body part, which defines a cavity;
a lid which is attached to the body part and which closes the cavity, the lid having lines of weakness which define an opening region having an area of from 75 mm² to 300 mm², the lines of weakness interspaced by a plurality of distances; and
tea material enclosed within the cavity, wherein at least 75% by weight of the tea material particles have a size of from 2 to 10 mm;

the brewing device comprising:
- an infusion chamber with a bottom rim which defines an opening;
- a capsule holder for receiving a capsule, the capsule holder comprising a sidewall defining an internal volume and having an upper rim, a filter coupled to the sidewall below the upper rim, the filter spanning across the internal volume, and an openable and closable passage extending through the sidewall at a location below the filter;
- means for moving the capsule holder and/or the infusion chamber so that the upper rim of the capsule holder is connected to the bottom rim of the infusion chamber;
- means for opening the opening region of the lid;
- means for introducing liquid into the capsule so that the liquid and tea material can mix and flow into the infusion chamber so as to brew a beverage; and
- a valve for opening the passage in the capsule holder to allow the beverage to flow from the infusion chamber through the filter and out through the passage.

19. The brewing device of claim 18, wherein the means for opening the opening region comprise a static opening member located on a manifold which supports the infusion chamber.

20. The brewing device of claim 19, wherein the opening member is aligned in the radial direction of the capsule and is sized so as to correspond to the width of the opening region in the radial direction.

* * * * *